(12) United States Patent
Zou et al.

(10) Patent No.: US 11,862,384 B2
(45) Date of Patent: Jan. 2, 2024

(54) TRANSFORMER AND POWER SUPPLY DEVICE WITH TRANSFORMER

(71) Applicant: TDK CORPORATION, Tokyo (JP)

(72) Inventors: Lian Wen Zou, Wuxi (CN); Qing Lu Qin, Wuxi (CN)

(73) Assignee: TDK CORPORATION, Tokyo (JP)

( * ) Notice: Subject to any disclaimer, the term of this patent is extended or adjusted under 35 U.S.C. 154(b) by 338 days.

(21) Appl. No.: 17/469,652

(22) Filed: Sep. 8, 2021

(65) Prior Publication Data

US 2022/0076880 A1 Mar. 10, 2022

(30) Foreign Application Priority Data

Sep. 9, 2020 (CN) .......................... 202010940704.2

(51) Int. Cl.
*H01F 27/29* (2006.01)
*H01F 27/28* (2006.01)
*H02M 7/04* (2006.01)
*H01F 30/00* (2006.01)
*H02M 7/00* (2006.01)

(52) U.S. Cl.
CPC ......... *H01F 27/2847* (2013.01); *H01F 30/00* (2013.01); *H02M 7/003* (2013.01); *H02M 7/043* (2013.01)

(58) Field of Classification Search
CPC .............. H01F 27/2847; H01F 30/00; H01F 2027/408; H01F 27/40; H01F 19/04; H01F 27/2852; H01F 27/29; H01F 27/306; H01F 2019/085; H01F 2027/2857; H02M 7/003; H02M 7/043; H02M 3/335; H02M 3/003; H02M 3/33523

See application file for complete search history.

(56) References Cited

U.S. PATENT DOCUMENTS

| 5,175,525 A * | 12/1992 | Smith ................. H01F 27/2866 336/83 |
| 6,046,662 A * | 4/2000 | Schroter ............. H01F 27/2804 336/200 |
| 7,408,436 B2 * | 8/2008 | Ikezawa ............... H01F 27/325 336/212 |

(Continued)

FOREIGN PATENT DOCUMENTS

JP 2002-165453 A 6/2002

*Primary Examiner* — Tuyen T Nguyen
(74) *Attorney, Agent, or Firm* — Oliff PLC

(57) ABSTRACT

A transformer and a power supply device. In the transformer, the first secondary coil including: first and second plate coils; and a first holding portion formed therebetween, the second secondary coil including: third and fourth plate coils; and a second holding portion formed therebetween, the first secondary coil is arranged between the third and fourth coils, the ends of the first plate coil and third plate coil are connected by solder, and the ends of the second plate coil and fourth plate coil are connected by solder, when the secondary-side rectifier circuit is a center-tapped rectifier circuit, the first holding portion, the second holding portion, and the bus bar are connected by solder through the connection hole, when the secondary-side rectifier circuit is a rectifier circuit other than the center-tapped rectifier circuit, the first holding portion and the second holding portion are connected by solder through the connection hole.

4 Claims, 2 Drawing Sheets

(56) References Cited

U.S. PATENT DOCUMENTS

| | | | |
|---|---|---|---|
| 7,511,599 B2* | 3/2009 | Ye | H01F 27/40 336/200 |
| 2013/0027165 A1* | 1/2013 | Lin | H01F 27/2866 336/192 |
| 2015/0155089 A1* | 6/2015 | Lu | H01F 27/40 336/185 |
| 2022/0069727 A1* | 3/2022 | Inoue | H02M 7/003 |

* cited by examiner

TRANSFORMER AND POWER SUPPLY DEVICE WITH TRANSFORMER

FIELD

The present invention relates to a transformer and a power supply device provided with the transformer.

BACKGROUND

Patent Document 1 discloses a transformer in which two secondary coils are connected to each other by fastening holes provided at one end of each of the two secondary coils being fastened via a screw.

In the above transformer, one end of each of the two secondary coils is fastened by screws. Therefore, in the structure in which the fastening part is attached to other components by screws, there is a problem that workability is low and the substrate on which the above-mentioned transformer is mounted must be provided with a space for drawing out the fastening part of the two secondary coils. In addition, in the above-mentioned transformer structure, in the case of a structure in which one end of each of the two secondary coils is connected by a screw and the other end of the two secondary coils is set as an output, there is also a problem that the current path of the portion where the ends of each of the two secondary coils are connected by screws becomes longer and the line loss becomes larger.

CITATION LIST

Patent Document 1: JP2002-165453A

SUMMARY

The present invention is an invention made in view of the above-mentioned problems, and its object is to provide a transformer that does not use a screw fastening structure and the secondary coil is connected by solder to be used as a set of secondary coils, which can reduce current line loss and improve heat dissipation, and the center-tapped rectification can be used as well as the rectification in the structure where the intermediate terminal of the secondary coil is connected by solder and both ends of the secondary coil are used as output (that is, the case where center-tapped rectification is not used), and a power supply device provided with the transformer.

In order to achieve the above-mentioned object, a transformer according to an aspect of the present invention is characterized by being a transformer including a primary coil, a first secondary coil, and a second secondary coil, the first secondary coil includes: a first plate coil; a second plate coil; and a first holding portion formed between one end of the first plate coil and one end of the second plate coil, the second secondary coil includes: a third plate coil; a fourth plate coil; and a second holding portion formed between one end of the third plate coil and one end of the fourth plate coil, and has a connection hole that is notched, the first secondary coil is formed such that the first plate coil and the second plate coil are opposed to each other substantially in parallel, the second secondary coil is formed such that the third plate coil and the fourth plate coil are opposed to each other substantially in parallel, the first secondary coil is arranged between the third plate coil and the fourth plate coil of the second secondary coil, the other end of the first plate coil and the other end of the third plate coil are connected by solder, and the other end of the second plate coil and the other end of the fourth plate coil are connected by solder, when a secondary-side rectifier circuit connected to the transformer is a center-tapped rectifier circuit, the first holding portion, the second holding portion, and the bus bar are connected by solder through the connection hole, when the secondary-side rectifier circuit is a rectifier circuit other than the center-tapped rectifier circuit, the first holding portion and the second holding portion are connected by solder through the connection hole.

In this way, the other end of the first plate coil and the other end of the third plate coil are connected by solder, and the other end of the second plate coil and the other end of the fourth plate coil are connected by solder, when the secondary-side rectifier circuit is a center-tapped rectifier circuit, the first holding portion, the second holding portion, and the bus bar are connected by solder through the connecting hole, when the secondary-side rectifier circuit is a rectifier circuit other than the center-tapped rectifier circuit, the first holding portion and the second holding portion are connected by solder through the connecting hole, therefore, instead of using a screw fastening structure, it is used as a set of secondary coils by connecting the secondary coils with solder. As a result, both reduction in current line loss and improvement in heat dissipation can be achieved, and the center-tapped rectification can be used as well as the rectification in the structure where the intermediate terminal of the secondary coil is connected by solder and both ends of the secondary coil are used as output (that is, the case where center-tapped rectification is not used).

In addition, in the transformer according to one aspect of the present invention, it is preferable that the bus bar is thicker than the thickness of the respective plates of the first plate coil, the second plate coil, the third plate coil, and the fourth plate coil, and is arranged between a substrate on which the transformer is mounted and the second holding portion, or between a substrate on which the transformer is mounted and a drawn out portion of the other end of at least either one of the third plate coil and the fourth plate coil.

A power supply device according to an aspect of the present invention is characterized by including the above-mentioned transformer.

According to the present invention, it is possible to provide a transformer that does not use a screw fastening structure and the secondary coil is connected by solder to be used as a set of secondary coils, which can reduce current line loss and improve heat dissipation, and the center-tapped rectification can be used as well as the rectification in the structure where the intermediate terminal of the secondary coil is connected by solder and both ends of the secondary coil are used as output (that is, the case where center-tapped rectification is not used), and a power supply device provided with the transformer.

DETAILED DESCRIPTION OF THE EMBODIMENT(S)

Figure 1:
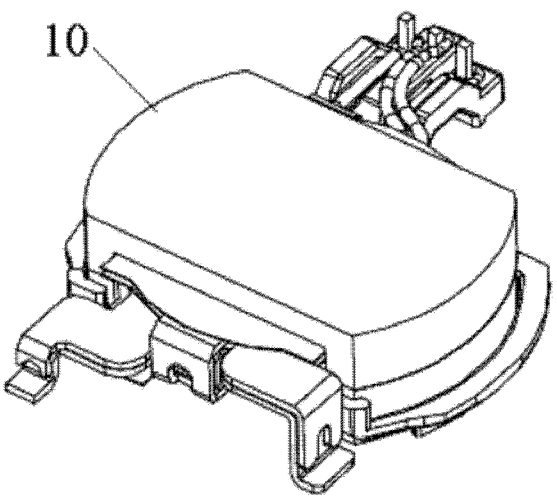
FIG. 1 is a perspective view showing a schematic configuration in the case of full-bridge rectification in the transformer according to the present embodiment.

Hereinafter, preferred embodiments of the present invention will be described in detail with reference to the accompanying drawings. Here, in the description of the drawings, the same reference numerals denote the same or equivalent elements, duplicated descriptions thereof will be omitted.

Figure 2:
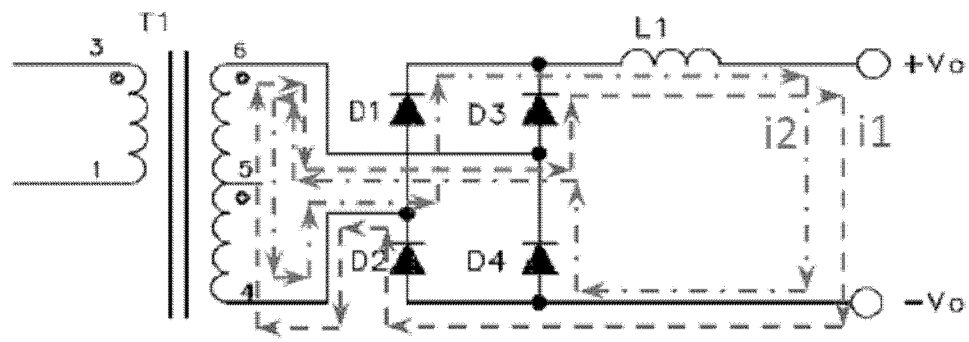
FIG. 2 is a circuit diagram showing a schematic configuration in the case of full-bridge rectification in the transformer according to the present embodiment.
Figure 3:
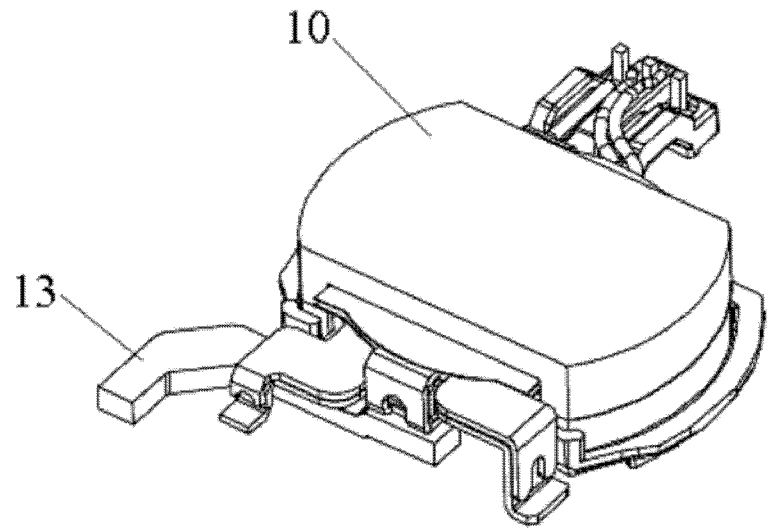
FIG. 3 is a perspective view showing a schematic configuration in the case of center-tapped rectification in the transformer according to the present embodiment.
Figure 4:
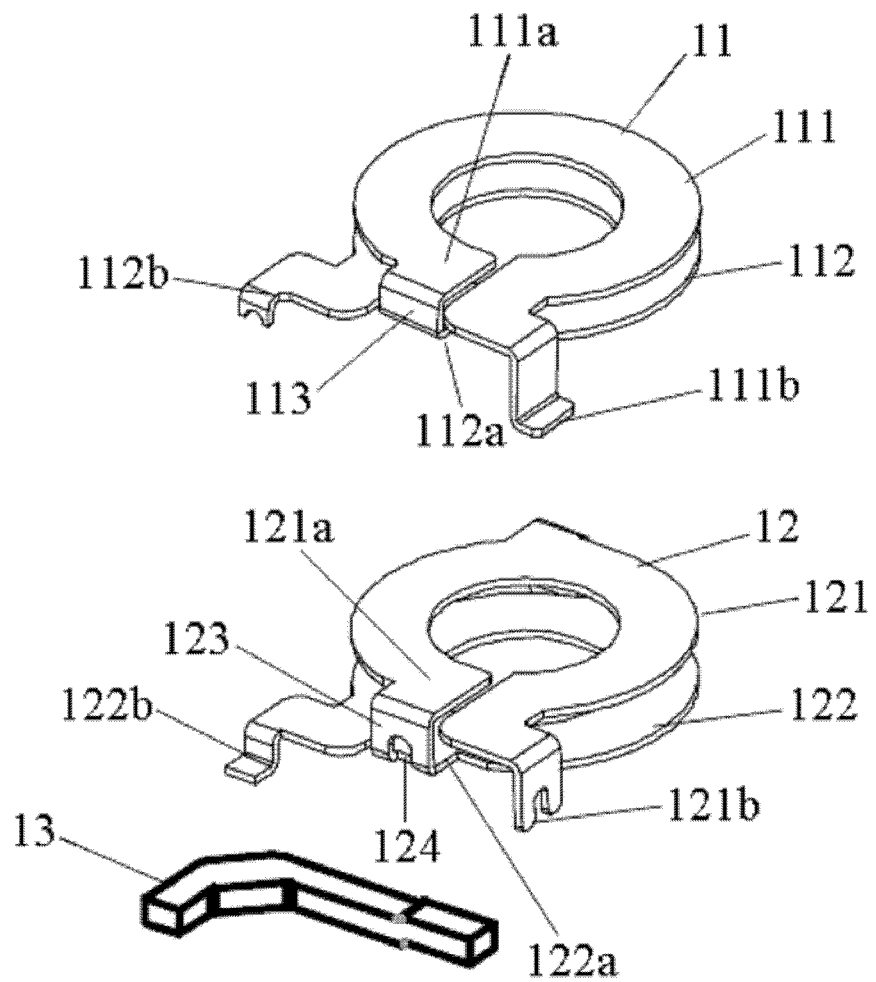
FIG. 4 is an exploded perspective view showing a schematic configuration of a secondary coil and a bus bar in the case of center-tapped rectification in the transformer according to the present embodiment.
Figure 5:
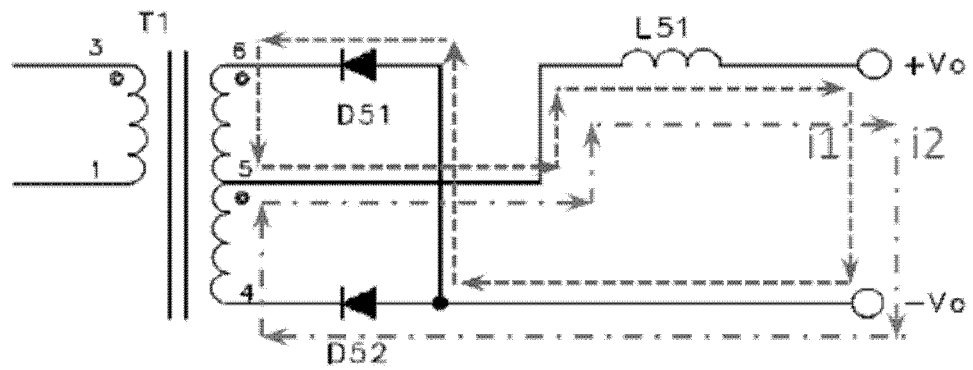
FIG. 5 is a circuit diagram showing a schematic configuration in the case of center-tapped rectification in the transformer according to the present embodiment.

FIG. 1 is a perspective view showing a schematic configuration in the case of full-bridge rectification in the transformer according to the present embodiment. FIG. 2 is a circuit diagram showing a schematic configuration in the case of full-bridge rectification in the transformer according to the present embodiment. FIG. 3 is a perspective view showing a schematic configuration in the case of center-tapped rectification in the transformer according to the present embodiment. FIG. 4 is an exploded perspective view showing a schematic configuration of a secondary coil and a bus bar in the case of center-tapped rectification in the transformer according to the present embodiment (the primary coil is omitted). FIG. 5 is a circuit diagram showing a schematic configuration in the case of center-tapped rectification in the transformer according to the present embodiment.

The transformer 10 according to the present embodiment is mounted on a power supply device for use. As shown in FIGS. 1 to 5, the transformer 10 becomes a structure comprising a primary coil and two secondary coils (a first secondary coil 11 and a second secondary coil 12) (The end of the primary coil to which a switching circuit is connected is the upper terminal part of FIGS. 1 and 3).

In addition, in the present embodiment, a transformer having such a structure is shown as an example, but it is not limited thereto, and various coil components such as an inductor having such a structure may be used.

In addition, in the present embodiment, a switching circuit that transmits power supplied from an input power supply to the first secondary coil 11 and the second secondary coil 12 is connected to the primary coil. In this way, by switching between ON/OFF of the switching circuit, it is possible to control such that the power supplied from the input power supply is transmitted from the primary coil to the first secondary coil 11 and the second secondary coil 12.

In addition, the first secondary coil 11 composed of a winding of a metal plate includes: a first plate coil 111; a second plate coil 112 and a first holding portion 113 formed between one end 111a of the first plate coil 111 and one end 112a of the second plate coil 112. The second secondary coil 12 composed of a winding of a metal plate includes: a third plate coil 121; a fourth plate coil 122; and a second holding portion 123 formed between one end 121a of the third plate coil 121 and one end 122a of the fourth plate coil 122, and has a connection hole 124 that is notched. The first secondary coil is formed such that the first plate coil and the second plate coil are opposed to each other substantially in parallel, the second secondary coil is formed such that the third plate coil and the fourth plate coil are opposed to each other substantially in parallel.

The first secondary coil 11 is arranged between the third plate coil 121 and the fourth plate coil 122 of the second secondary coil 12. The other end 111b of the first plate coil 111 and the other end 121b of the third plate coil 121 are connected by solder, and the other end 112b of the second plate coil 112 and the other end 122b of the fourth plate coil 122 are connected by solder.

That is, the two secondary coils 11 and 12 in the present embodiment are combined with each other to form a parallel structure by installing the first secondary coil 11 inside the second secondary coil 12 as the winding of the metal plate, and connecting the first secondary coil 11 and the second secondary coil 12 with solder. In addition, considering the skin effect of the high-frequency current, it is preferable that the two secondary coils have a parallel connection structure to reduce the loss caused by the skin effect. However, it is not limited to thereto, and the secondary coil may be appropriately thickened to adopt a single secondary coil structure.

In addition, in the present embodiment, in order to rectify the power transmitted from the primary coil to the first secondary coil 11 and the second secondary coil 12 and output it to a smoothing circuit equipped with output terminals, a secondary-side rectifier circuit is connected to the transformer 10.

Also, according to the location where the secondary-side rectifier circuit is connected, the secondary-side rectifier circuit is divided into a center-tapped rectifier circuit and a rectifier circuit other than the center-tapped rectifier circuit.

Specifically, when the secondary-side rectifier circuit is connected to the outputs terminals 4 and 6 of the secondary coil (that is, the end where the other end 111b of the first plate coil 111 and the other end 121b of the third plate coil 121 are connected by solder, and the end where the other end 112b of the second plate coil 112 and the other end 122b of the fourth plate coil 122 are connected by solder), the secondary-side rectifier circuit is referred to as a rectifier circuit other than the center-tap rectifier circuit. As an example, a full-bridge rectifier circuit as shown in FIG. 2 can be cited.

In addition, when the secondary-side rectifier circuit is connected to the output terminals 4 and 6 of the secondary coil, the first holding portion 113 and the second holding portion 123 are connected by solder through the connection hole 124 provided in the second holding portion 123, wherein the first holding portion 113 is formed between one end 111a of the first plate coil 111 and one end 112a of the second plate coil 112, the second holding portion 123 is formed between one end 121a of the third plate coil 121 and one end 122a of the fourth plate coil 122. In addition, the first plate coil 111 and the third plate coil 121 and the second plate coil 112 and the fourth plate coil 122 are separated from each other by insulating tapes, respectively.

On the other hand, when the secondary-side rectifier circuit is connected not only to the output terminals 4 and 6 of the secondary coil, but also connected to the intermediate terminal 5 of the secondary coil, that is, when the first holding portion 113 formed between one end 111a of the first plate coil 111 and one end 112a of the second plate coil 112, the second holding portion 123 formed between one end 121a of the third plate coil 121 and one end 122a of the fourth plate coil 122, and one end of the bus bar 13 described below are connected to the other end of the bus bar 13 connected by solder through the connection hole 124 provided in the second holding portion 123, the secondary-side rectifier circuit is referred to as a center-tapped rectifier circuit. As an example, a full-wave rectifier circuit as shown in FIG. 5 can be cited.

That is, it is possible to switch the secondary-side rectification method between, for example, a full-bridge rectification method and a center-tapped rectification method by providing a bus bar on the intermediate end side of the secondary coil.

In this way, the other end of the first plate coil and the other end of the third plate coil are connected by solder, and the other end of the second plate coil and the other end of the fourth plate coil are connected by solder, when the secondary-side rectifier circuit is a center-tapped rectifier circuit, the first holding portion, the second holding portion, and the bus bar are connected by solder through the connection hole, when the secondary-side rectifier circuit is a rectifier circuit other than the center-tapped rectifier circuit, the first holding portion and the second holding portion are connected by solder through the connection hole, so that the screw fastening structure is not used, and the secondary coil is connected by solder to be used as a set of secondary coils. As a result, the end portions 111*b*, 122*b* and the bus bar 13 are directly soldered to the substrate with solder to reduce the current line loss and improve the heat dissipation, and the center-tapped rectification can be used as well as the rectification in the structure where the intermediate terminal of the secondary coil is connected by solder and the two ends of the secondary coil are output (that is, the case where center-tapped rectification is not used).

In addition, in the present embodiment, it is preferable that the bus bar 13 is thicker than the thickness of the respective plates of the first plate coil 111, the second plate coil 112, the third plate coil 121, and the fourth plate coil 122, and is arranged between the substrate on which the transformer 10 is mounted and the second holding portion 123, or between the substrate on which the transformer 10 is mounted and the drawn out portion of the other end of at least either one of the third plate coil and the fourth plate coil.

By using a bus bar thicker than the thickness of the plate of the plate coil, the heat of each plate coil is easily dissipated to the bus bar, and the line loss of the current flowing in the bus bar can also be reduced. Therefore, the heat dissipation effect of the transformer is further improved. In addition, by arranging the bus bar between the substrate on which the transformer is mounted and the holding portion of the coil, or between the substrate on which the transformer is mounted and the drawn out portion of the end (terminal) of the coil, effective utilization of the substrate space and miniaturization of the substrate can be achieved.

The preferred embodiments of the present invention have been described above. However, various changes and modifications can be made without departing from the gist of the present invention.

The invention claimed is:

1. A transformer having a primary coil, a first secondary coil and a second secondary coil, the first secondary coil comprising:
   a first plate coil;
   a second plate coil; and
   a first holding portion formed between one end of the first plate coil and one end of the second plate coil,
   the second secondary coil comprising:
   a third plate coil;
   a fourth plate coil; and
   a second holding portion formed between one end of the third plate coil and one end of the fourth plate coil, and has a connection hole that is notched,
   the first secondary coil is formed such that the first plate coil and the second plate coil are opposed to each other substantially in parallel, the second secondary coil is formed such that the third plate coil and the fourth plate coil are opposed to each other substantially in parallel,
   the first secondary coil is arranged between the third plate coil and the fourth plate coil of the second secondary coil, the other end of the first plate coil and the other end of the third plate coil are connected by solder, and the other end of the second plate coil and the other end of the fourth plate coil are connected by solder,
   when a secondary-side rectifier circuit connected to the transformer is a center-tapped rectifier circuit, the first holding portion, the second holding portion, and a bus bar are connected by solder through the connection hole, when the secondary-side rectifier circuit is a rectifier circuit other than the center-tapped rectifier circuit, the first holding portion and the second holding portion are connected by solder through the connection hole.

2. The transformer according to claim 1, wherein the bus bar is thicker than the thickness of the respective plates of the first plate coil, the second plate coil, the third plate coil, and the fourth plate coil, and is arranged between a substrate on which the transformer is mounted and the second holding portion, or between a substrate on which the transformer is mounted and a drawn out portion of the other end of at least either one of the third plate coil and the fourth plate coil.

3. A power supply device comprising the transformer according to claim 1.

4. A power supply device comprising the transformer according to claim 2.

* * * * *